United States Patent [19]
Ueda et al.

[11] Patent Number: 5,668,458
[45] Date of Patent: Sep. 16, 1997

[54] SYNCHRONOUS MACHINE WITH HARMONICS DAMPENING

[75] Inventors: Yoshisuke Ueda, Shiga; Fuyuto Takase, Kyoto; Kiyoshi Oku, Osaka; Takayuki Hira; Atsushi Ashizawa, both of Kanagawa, all of Japan

[73] Assignees: Kansai Electric Power Co., Inc., Osaka; Fuji Electric Co., Kawasaki, both of Japan

[21] Appl. No.: 389,692

[22] Filed: Feb. 15, 1995

[30] Foreign Application Priority Data

Feb. 15, 1994 [JP] Japan ................................ 6-017708

[51] Int. Cl.⁶ .................................................. H02P 13/00
[52] U.S. Cl. .................................... 318/716; 318/138
[58] Field of Search ................................ 318/254, 439, 318/138, 632, 716; 310/182, 183, 68 R; 363/44

[56] References Cited

U.S. PATENT DOCUMENTS

| | | | |
|---|---|---|---|
| 1,894,455 | 1/1933 | Youhouse | 310/183 |
| 3,686,523 | 8/1972 | Gordon et al. | |
| 3,983,469 | 9/1976 | Brown | 323/8 X |
| 4,053,820 | 10/1977 | Peterson et al. | 363/44 |
| 4,206,395 | 6/1980 | Okuyama et al. | 318/716 |
| 4,426,606 | 1/1984 | Suita et al. | 318/375 |
| 4,494,050 | 1/1985 | Godfrey et al. | 318/158 |
| 4,723,202 | 2/1988 | Kalman | 318/138 X |
| 4,885,526 | 12/1989 | Szabo | 310/183 X |

FOREIGN PATENT DOCUMENTS

| | | | |
|---|---|---|---|
| 0117764 | 9/1984 | European Pat. Off. | |
| 270002 | 6/1912 | Germany | |
| 1265839 | 4/1968 | Germany | |
| 3929556 | 2/1990 | Germany | 310/182 |
| 90146275 | 6/1990 | U.S.S.R. | |
| 91265469 | 10/1991 | U.S.S.R. | |

*Primary Examiner*—Jonathan Wysocki
*Attorney, Agent, or Firm*—Greer, Burns & Crain, LTD

[57] ABSTRACT

A synchronous machine effectively absorbs higher harmonics in an AC system to which the synchronous machine is linked. The synchronous machine includes a damper winding, disposed on each magnetic pole and constituting by itself an independent closed circuit; capacitors, each of which is connected in parallel with each of several damper winding divisions obtained by dividing the damper winding at predetermined winding turns; a DC reactor for blocking flowing-in of higher harmonics to a DC power supply for DC excitation; a series resonant circuit further including the damper winding and the capacitors; and a series resonant circuit including the field winding and capacitors. Resonant frequencies of both series resonant circuits are set at 6 nf (n: an integer, f: a fundamental frequency) so as to greatly reduce impedance of the damper winding and the field circuit seen from an armature of the synchronous machine, by which to extinguish or reduce higher harmonics $(6n\pm1)f$ of the AC system.

19 Claims, 2 Drawing Sheets

SYNCHRONOUS MACHINE WITH HARMONICS DAMPENING

BACKGROUND OF THE INVENTION

1. Field of the Invention

The present invention relates to a synchronous machine connected to an alternating current electric power transmitting or distributing system, and more specifically to an alternating current synchronous machine which facilitates absorbing specific higher harmonics superimposed on a fundamental wave voltage of a connected alternating current system (AC system).

2. Description of the Prior Art

Synchronous machines are widely used for generators in power stations, constant speed motors, etc. Therefore, the synchronous machines are in most cases directly connected to AC systems.

On the other hand, also connected to the AC systems are a number of power converters and rectifiers provided with electric power thyristors, etc. which may cause higher harmonics. These higher harmonics have the frequency n times higher than the fundamental AC wave voltage of the system, are harmful to electric devices connected to the system, and can invite malfunctions in communications devices in the vicinity. Under such conditions, there is the serious problem that these higher harmonics should be successfully removed from the AC systems. The above described synchronous machine is provided with a damper winding to absorb higher harmonics generated in the AC system. That is, the damper winding is provided on the pole face of the magnetic pole of the synchronous machine. Practically, plural slots are made on the magnetic pole and filled with damper bars to form a cage type conductor by short-circuiting both ends of the damper bars. This configuration is normally used to reduce the fluctuation of the internal phase angle caused by a sudden change of load. Additionally, it has the function of absorbing higher harmonics by supplying an induced current which reduces a magnetic field generated on an armature by a higher harmonic current. That is, if a higher harmonic current flows through the armature of a synchronous machine from the AC system connected to the armature, then a higher harmonic magnetic field is generated asynchronous with the fundamental AC wave. This magnetic field generates an induced current through the damper winding, which reduces the higher harmonic magnetic field, and absorbs the higher harmonic current.

As described above, the higher harmonics are absorbed by the damper winding by causing the induced current through the damper winding to reduce the higher harmonic magnetic field generated on an armature winding. The damper winding, which is composed of a damper bar and a short-circuit conductor, generates a large leakage inductance, which allows insufficient induced current. Therefore, the asynchronous higher harmonic magnetic field generated by the higher harmonic current from the AC system cannot be completely reduced. As a result, the above described damper winding has failed in sufficiently reducing higher harmonics.

SUMMARY OF THE INVENTION

The present invention relates to an alternating current synchronous machine (AC synchronous machine) which facilitates absorbing specific higher harmonics superimposed on a fundamental AC wave voltage of an alternating current system (AC system) to which the AC synchronous machine is linked.

In the AC synchronous machine, provided with such a higher harmonics absorption function according to the prior art, field winding and damper winding, which damper winding is further constructed in a cage-type winding formed by short-circuiting both ends of damper bars disposed in slots on a pole face, are arranged on the magnetic poles.

The object of the present invention is achieved by a rotating field synchronous machine which is comprised of magnetic poles; a damper winding disposed on each of the magnetic poles which constitutes by itself an independent closed circuit, the damper winding being divided into a predetermined number of winding divisions, each of which has a predetermined number of winding turns; capacitors, each of which are connected in parallel with each of the winding divisions; and a series resonant circuit, which is further comprised of the capacitors and the damper winding, and which resonates at a specific resonant frequency.

The object of the present invention is also achieved by a rotating field synchronous machine which is comprised of magnetic poles; a field winding disposed on the magnetic poles; a DC reactor for blocking higher harmonics from flowing into a DC excitation power supply; a capacitor connected in parallel with the field winding on the field winding side of the DC reactor; and a series resonant circuit, which is further comprised of the capacitor and the field winding, and which resonates at a specific resonant frequency.

The object of the present invention is achieved also by a rotating field synchronous machine which is comprised of magnetic poles; a damper winding disposed on each of the magnetic poles which constitutes by itself an independent closed circuit, the damper winding being divided into a predetermined number of winding divisions, each of which has a predetermined numbers of winding turns; the first capacitors, each of which is connected in parallel with each of the winding divisions; the first series resonant circuit, which is further comprised of the first capacitors and the damper winding, and which resonates at the first resonant frequency; a field winding disposed on the magnetic poles; the second capacitor connected in parallel with the field winding; and the second series resonant circuit, which is further comprised of the second capacitor and the field winding, and which resonates at the second resonant frequency.

It is preferable to set the resonant frequency at a frequency 6n times higher than the fundamental frequency of the synchronous machine, where n is a positive integer. Or, it is preferable to set the first and the second resonant frequencies at a frequency 6n times higher than the fundamental frequency of the synchronous machine.

It is preferable to mount the capacitors, connected with the damper winding, on a rotor of the synchronous machine.

It can also be preferable to dispose the capacitors, connected with the damper winding, on an external stationary side of the synchronous machine and to connect the capacitors with the damper winding through paired slip rings and brushes.

The rotating field synchronous machine is preferably comprised of a brush-less synchronous machine, to which an excitation current is supplied from a rotating armature type AC exciter mounted on a shaft common with the synchronous machine. The capacitors, connected with the damper winding and the field winding, are preferably mounted on a rotor of the brush-less synchronous machine.

It is preferable to connect the capacitors with the damper winding through parallel circuits comprised of a reactor and a capacitor, or the capacitor with the field winding through a parallel circuit comprised of a reactor and a capacitor. It is also preferable to connect the first capacitors with the damper winding through parallel circuits comprised of a reactor and a capacitor, and the second capacitor with the field winding through a parallel circuit comprised of a reactor and a capacitor.

As described earlier, it is necessary for reducing (absorbing) higher harmonic components on the side of an AC system by an AC synchronous machine operated in linkage with the AC system, to reduce the impedance for the system side higher harmonics of the damper winding and the field winding circuits, positioned on the load side with respect to the armature (in which the system side higher harmonics flow in) of the synchronous machine, so as to allow to flow in either one or both of the winding circuits of a higher harmonic current or currents large enough to cancel a synchronous higher harmonic magnetic field generated by the system side higher harmonics flowing in the armature of the synchronous machine.

In view of the foregoing, the subject matters of the present invention include impedance reduction measures for the system side higher harmonics, facilitated by formation of a series resonant circuit or series resonant circuits in either one or both of the damper winding and the field winding circuits, and by the arrangements of the pertinent constituent elements, as described below.

(1) According to the present invention, a rotating field synchronous machine is comprised of magnetic poles; a damper winding disposed on each of the magnetic poles which constitutes by itself an independent closed circuit, the damper winding being divided into a predetermined number of winding divisions, each of which has a predetermined number of winding turns; capacitors, each of which are connected in parallel with each of the winding divisions, by which to form resonant circuits, each of which is comprised of the capacitor and the winding division which interlinks the asynchronous higher harmonics magnetic field and induces a voltage; and a series resonant circuit, which is further comprised of the resonant circuits, and which resonates as a whole at a specific resonant frequency as determined by the higher harmonic components on the AC system side.

In this synchronous machine, leakage inductance of the damper winding is canceled, by equivalency, when the series resonant circuit is resonating, and because of which, the impedance of the damper winding is greatly reduced.

(2) According to the present invention, a rotating field synchronous machine is also comprised of magnetic poles; a field winding disposed on the magnetic poles; a DC reactor for blocking higher harmonics from flowing into a DC excitation power supply; a capacitor connected in parallel with the field winding on the field winding side of the DC reactor; and a series resonant circuit, which is further comprised of the capacitor and the field winding, and which resonates at a specific resonant frequency. This synchronous machine greatly reduces the impedance of the field circuit for the higher harmonics.

(3) According to the present invention, a rotating field synchronous machine is also comprised of magnetic poles; a damper winding disposed on each of the magnetic poles which constitutes by itself an independent closed circuit, the damper winding being divided into a predetermined number of winding divisions, each of which has a predetermined number of winding turns; the first capacitors, each of which are connected in parallel with each of the winding divisions; the first series resonant circuit, which is further comprised of the first capacitors and the damper winding, and which resonates at the first resonant frequency; a field winding disposed on the magnetic poles; the second capacitor connected in parallel with the field winding; and the second series resonant circuit, which is further comprised of the second capacitor and the field winding, and which resonates at the second resonant frequency. By setting the first and the second resonant frequencies at the same frequency, the absorption capability for the system side higher harmonics in this synchronous machine is greatly improved.

(4) Each of the resonant frequencies or each of the first and the second resonant frequencies is set at a frequency 6n times higher than a fundamental frequency f of the synchronous machine, in which n is a positive integer.

Since the frequencies of the significantly higher harmonic components on the side of the AC system are $(6n\pm1)f$, for example the fifth and the seventh harmonics, the frequency of the current induced in the damper winding or the field winding of the synchronous machine rotating at a speed corresponding to the frequency f, is 6nf. In other words, the current of the damper winding or of the field winding, the frequency of which current is 6nf, generates higher harmonics, the frequencies of which are $(6n\pm1)f$, in the armature of the synchronous machine.

(5) By mounting the capacitors, connected with the damper winding, on a rotor of the synchronous machine, slip rings and brushes for coupling the capacitors with the damper winding when the capacitors are mounted on the external stationary side, are eliminated.

(6) When the capacitors have to be mounted on the external stationary side, the capacitors are connected with the damper winding through paired slip rings and brushes.

Whether the capacitors are to be mounted on the rotor of the synchronous machine or on the external stationary side, is selected on the basis of the appropriateness of mounting the capacitors on the rotor.

(7) The synchronous machine, which is comprised of a brush-less synchronous machine, facilitates mounting all capacitors for resonance on the rotor of the synchronous machine, thereby eliminating slip rings and brushes.

(8) By connecting each capacitor through a parallel circuit comprised of a reactor and a capacitor, these circuits are provided with two resonant frequencies, for example 6f and 12f, by which to expand the frequency range of the system side higher harmonics of which the synchronous machine is capable of absorbing.

DESCRIPTION OF THE PREFERRED EMBODIMENT

Figure 1:
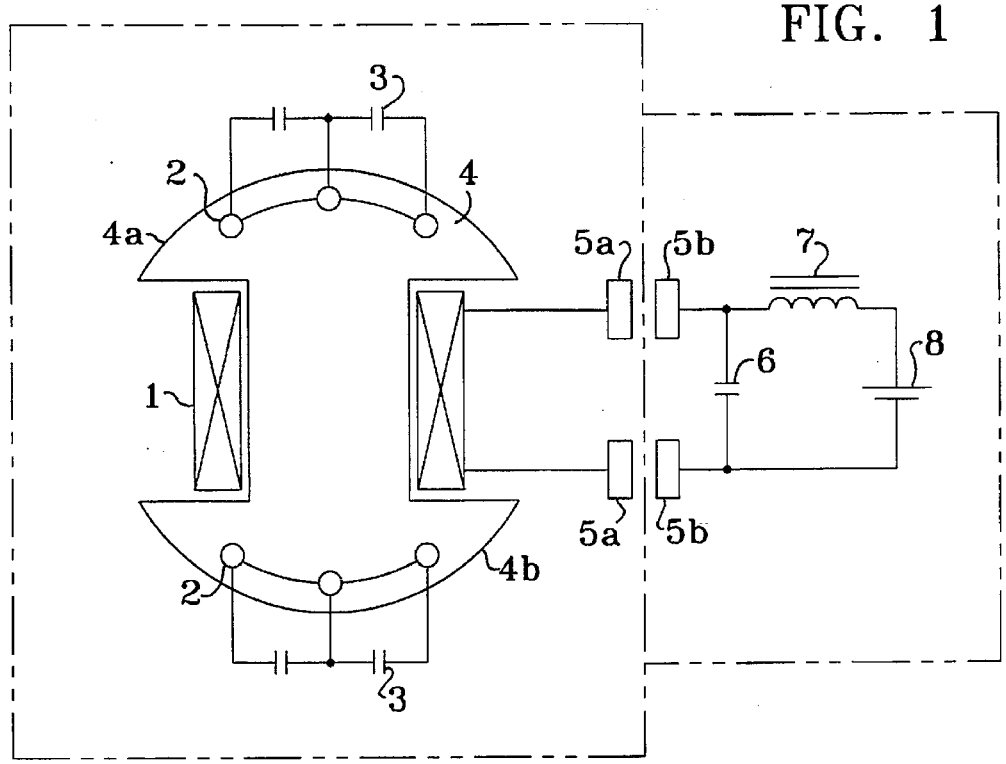
FIG. 1 is a circuit diagram of an embodiment of a rotating field synchronous machine with two salient poles and with brushes (the first embodiment) according to the present invention.
Figure 2:
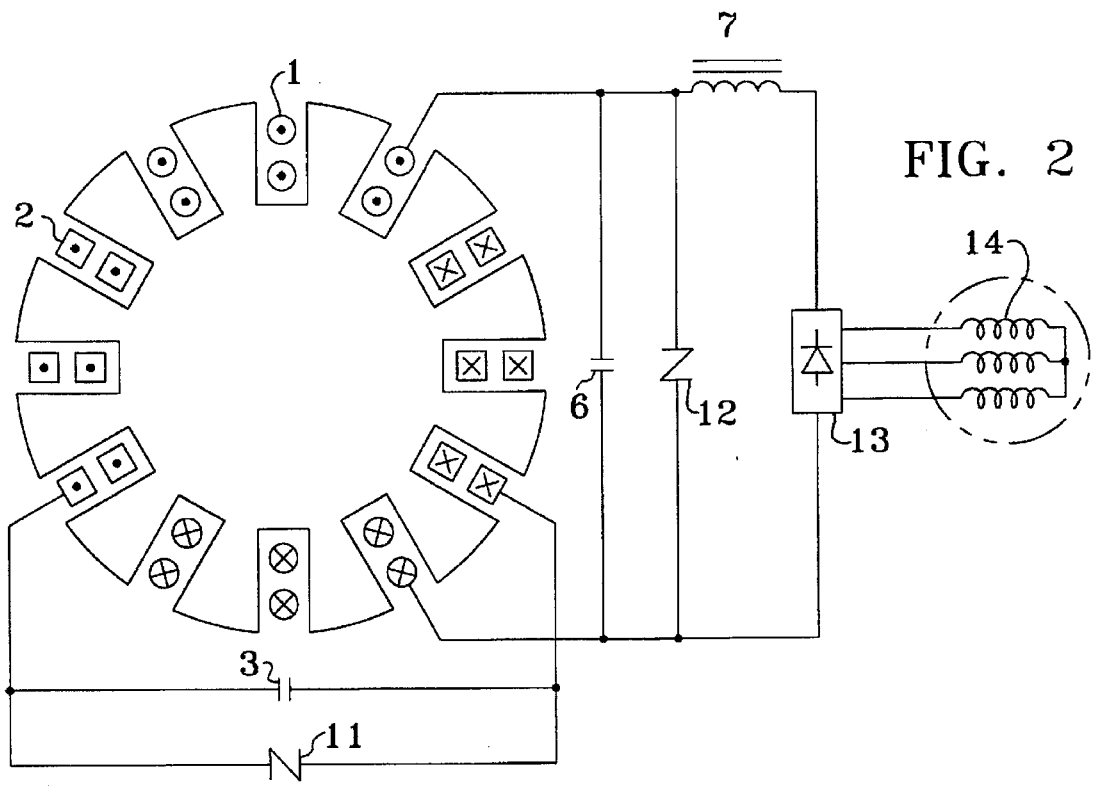
FIG. 2 is a circuit diagram of an embodiment of a rotating field cylindrical rotor brush-less synchronous machine (the second embodiment) according to the present invention.
Figure 3:
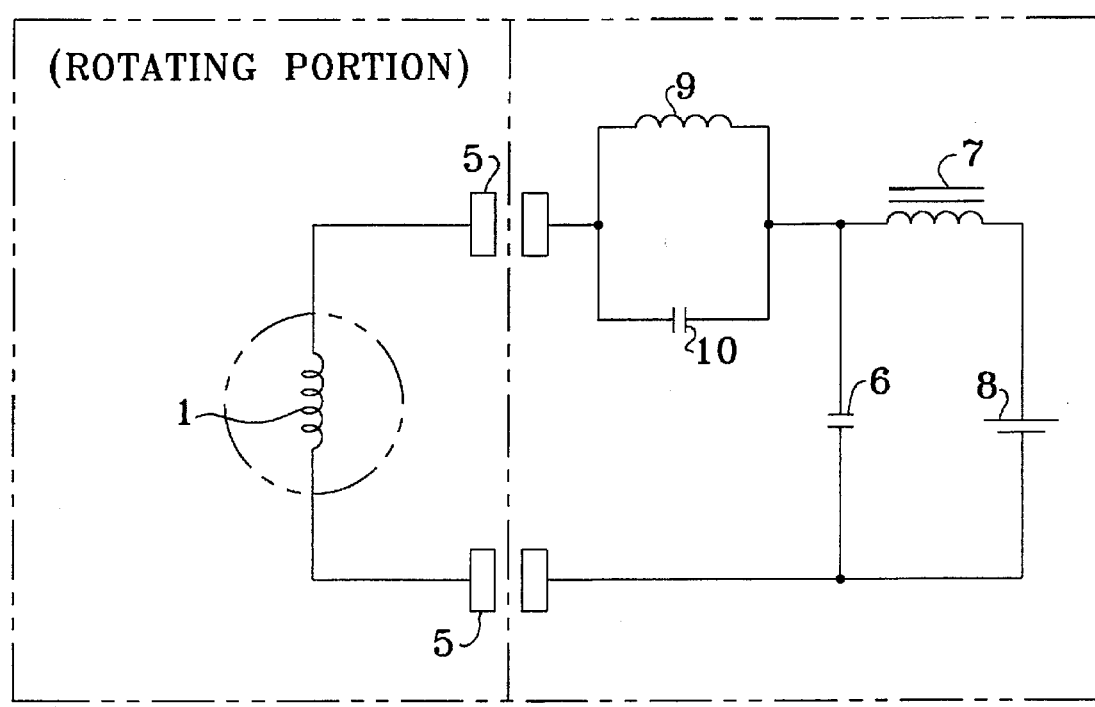
FIG. 3 is a circuit diagram of an embodiment of a general AC synchronous machine (the third embodiment) according to the present invention.

Hereinafter the present invention will be described in detail hereinafter with accompanied drawings FIGS. 1 through 3, which illustrate the preferred embodiments of the present invention. In FIGS. 1, 2 and 3, the constituents having the same function are designated by the same reference numerals.

FIG. 1 is a circuit diagram of an embodiment of a rotating field synchronous machine with two salient poles and with brushes (the first embodiment).

In FIG. 1, a reference numeral 1 designates a field winding of the synchronous machine; 2 a damper winding comprising an independent closed circuit arranged in a plurality of slots disposed on a pole face of a magnetic pole 4; and 3 a capacitor for resonance connected in parallel with a division of the damper winding obtained by dividing the damper winding 2 at every predetermined number of winding turns. Although three damper windings 2 are shown in FIG. 1, a number of damper windings are mounted in a section, each being connected to a single capacitor 3. Each element enclosed by a single-dotted chain line forms a rotating portion mounted on the stator of the synchronous machine.

Therefore, side faces 4a and 4b of the above described magnetic pole 4 are provided with armatures (not shown in the drawings) at predetermined intervals, each armature being connected to an AC system.

The Slip rings 5a connect with the pair of brushes 5b, supported by the stator of the synchronous machine; a capacitor 6 is connected in parallel with the field winding 1 through brushes 5b and slip rings 5a; a direct current reactor 7 prevents higher harmonics; and a direct current power source 8 supplies the field winding 1 with a direct excitation current. These constituent elements surrounded by a single-dotted chain line in the figure are arranged on the outer stationary side of the synchronous machine.

A closed circuit comprised of the damper winding 2 and the capacitors 3 of the above described synchronous machine forms a series resonant circuit for a specific frequency. That is, the inductance value of the damper winding 2 and the capacitance of the capacitor 3 are properly set to form a series resonant circuit with an impedance of 0 at the specific resonant frequency. When an induced current flows at a specified frequency, the circuit impedance of the damper winding 2 is approximately 0, thereby allowing a larger induced current to flow through the damper winding. For example, if the specified frequency refers to higher harmonics (6n±1) f (where f indicates a fundamental AC wave frequency) as being the most significant higher harmonic components), then the inductance value of the damper winding 2 and the capacitance of the capacitor 3 are set for resonance with this frequency. Thus, an induced current flows through the damper winding 2 and reduces the higher harmonic magnetic field by the 5th and 7th higher harmonics (n=6 having the largest influence on the fundamental AC wave) from the fundamental wave. The impedance of the induced current is low enough to completely reduce the higher harmonic magnetic field. Likewise, in the series resonant circuit comprising the field winding 1 and the capacitor 6, properly setting the inductance value of the field winding 1 and the capacitance of the capacitor 6 sets the impedance to 1 for the higher harmonic components, thereby reducing the higher harmonic magnetic field generated in the armature. Thus, the two above described series resonant circuits can reduce the asynchronous higher harmonic magnetic field generated at the armature winding and completely absorb the higher harmonics (for example the 5th and 7th higher harmonics) contained in the AC system.

FIG. 2 is a circuit diagram of an embodiment of a rotating field cylindrical rotor brush-less synchronous machine (the second embodiment).

In FIG. 2, reference numerals 1 and 2 designate a field winding and a damper winding which are schematically shown by symbols (circle) and (square) in the figure, respectively. Symbols (.) and (X) included in the symbols (circle) and (square), indicate respectively the directions of the current flowing out and in through the illustrated cross section. Reference numerals 3 and 11 designate respectively a capacitor for resonance and a varistor connected in parallel with the damper winding 2; and 6 and 12 a capacitor for resonance and a varistor respectively connected in parallel with the field winding 1. A pair of the capacitor 3 and the varistor 11 is schematically shown in FIG. 2 solely for simplicity.

A reference numeral 14 designates an armature of a rotating armature type AC exciter, driven on a shaft common with a rotor of the synchronous machine. Output voltage of the armature 14 is controlled by a excitation regulating apparatus (not shown) disposed outside the synchronous machine. A reference numeral 13 designates a rectifier (rotating rectifier) disposed on the rotor of the synchronous machine. Output from the armature of the AC exciter, rectified by the rectifier 13, is supplied to the field winding 1 of the synchronous machine through a DC reactor 7, for blocking higher harmonics. That is, a field current of a synchronous machine is supplied by a direct current exciter, which removes the need for brushes 5b and slip rings 5a as shown in FIG. 1. Therefore, the field current can be made variable by adjusting the excitation current provided to the direct current exciter.

In the second embodiment, a series resonant circuit comprised of the damper winding 2 and the capacitor 3 and a series resonant circuit comprised of the field winding 1 and the capacitor 6 have the same resonant frequency. The resonant frequency is set at 6nf corresponding to the most significant higher harmonic components (6n±1)f.

The first closed circuit comprising the damper winding 2 and the capacitor 3 of the synchronous machine with the above described configuration and the second series resonant circuit comprising the field winding 1 and the capacitor 6, indicate the impedance of approximately 0 for a specified frequency, thereby allowing a large induced current to flow through the damper winding. For example, if the specified frequency refers to the higher harmonics f (6n±1, where f indicates a fundamental AC wave frequency) as the most significant higher harmonic components, then the induced current which is resonant with the frequency and which reduces the higher harmonic magnetic field through the 5th and 7th higher harmonics (n=6 having the largest influence on the fundamental AC wave) is made to flow through the field winding 1 and the damper winding 2, to reduce the higher harmonics generated in the armature and to absorb the higher harmonics in the AC system.

When the series resonant circuit of the damper winding 2 and the capacitor 3 has been brought into its state of resonance, and the induced current due to the higher harmonics on the AC system side has increased the charge on capacitor 3 so much as to boost the terminal voltage of the capacitor 3 beyond a predetermined value, the varistor 11 becomes conductive to lower the Q value of the resonant circuit, so as to suppress the aforementioned induced current. The varistor 12 functions in a similar manner as the varistor 11.

The varistors 11, 12 may be replaced by voltage regulation diodes or discharge gaps which function similarly.

FIG. 3 is a circuit diagram of an embodiment of a general AC synchronous machine (the third embodiment).

As shown in FIG. 3, a parallel-series circuit, comprised of a parallel circuit of an AC reactor 9 and a capacitor 10, to which a capacitor 6 is connected in series, is connected in parallel with a field winding 1 of the synchronous machine for blocking the higher harmonic components of the system side in the field winding 1.

There are two resonant frequencies in the field circuit having the above described circuit configuration. By properly selecting the constants of the constituent elements of the field winding circuit, the above described two resonant frequencies can be set at the frequencies in accordance with the two most significant components of the higher harmonics of the AC system so that the frequency range, in which the higher harmonics of the AC system should be reduced, may be expanded.

For example, by setting the inductance of the field winding 1 and the reactor 2 at 24 mH and 10 mH respectively, the static capacitance of the capacitors 6 and 10 at 4.7 μF and 8.5 μF respectively, and the inductance of the DC reactor 7 at a large enough value, the aforementioned field winding circuit has two resonant frequencies of 360 Hz and 720 Hz, which correspond to the sixth and the twelfth higher harmonics of the AC synchronous machines, the rated frequency of which is 60 Hz.

Therefore the impedance, seen from the armature side of the synchronous machine, for the fifth, seventh, eleventh and thirteenth higher harmonics, significant in the AC system, becomes extremely low. Thus, the above described higher harmonics on the AC system side can satisfactorily be absorbed by the synchronous machine of the third embodiment.

The circuit configuration which obtains two resonant frequencies, for absorbing the higher harmonic components of the system side, by connecting, as shown in FIG. 3, a filter circuit comprised of the capacitors 3 and 10, and the reactor 9 with the field winding 1, is applicable to the damper winding 2. This circuit configuration is also applicable to synchronous machines irrespective of whether or not they are brush-less.

As has been explained so far, according to the present invention, the impedance of either one or both of the damper winding and the field winding circuits for the most significant (6n±1)th higher harmonics on the system side, for example the fifth, the seventh, the eleventh and the thirteenth, are greatly reduced, and the (6n±1)th higher harmonics on the system side are reduced by flowing a sufficient induced current in either one or both of the damper winding and the field winding, which induced current interlinks and cancels the asynchronous higher harmonic magnetic field generated by the armature of the synchronous machine. That is, the higher harmonics on the system side are absorbed by the synchronous machine according to the present invention;

(1) by forming a series resonant circuit with a damper winding divided at a predetermined number of winding turns into winding divisions with capacitors, each of which is connected in parallel with each of the winding divisions; or (2) by forming a series resonant circuit with a field winding and with a capacitor connected in parallel with the field winding; or (3) by forming the first series resonant circuit with a damper winding divided at a predetermined number of winding turns into winding divisions with the first capacitors, each of which is connected in parallel with each of the winding divisions, and the second series resonant circuit with a field winding with the second capacitor, connected in parallel with the field winding; and by setting the resonant frequencies of the first and the second resonant circuits at the same frequency; and (4) by setting either one of the resonant frequencies or each of the first and the second resonant frequencies at the frequency 6nf of the 6nth harmonic wave (n: a positive integer, and f: a fundamental frequency) corresponding to the most significant higher harmonics in the AC system to be absorbed; or (5) by connecting the capacitors with the damper winding through parallel circuits of a reactor and a capacitor, by connecting the capacitor with the field winding through a parallel circuit of a reactor and a capacitor, or by connecting the first and the second capacitors with the damper winding and the field winding through parallel circuits of a reactor and a capacitor, and by providing with two resonant frequencies.

When the capacitors connected with the damper winding can practically be mounted on the rotor of the synchronous machine, (6) by mounting the capacitors on the rotor of the synchronous machine, the slip rings and the brushes, which would be necessary for coupling capacitors mounted on the external stationary side of the synchronous machine with the damper winding, can be eliminated.

When it is not appropriate to mount the capacitors connected with the damper winding on the rotor of the synchronous machine, (7) a series resonant circuit may be formed without any problems by mounting the capacitors on the external stationary side of the synchronous machine and by connecting the capacitors with the damper winding through slip rings and brushes.

When the capacitors connected with the damper winding and the capacitor connected with the field winding can practically be mounted on the rotor of the synchronous machine, (8) the synchronous machine may be comprised of a brushless synchronous machine, and the slip rings and the brushes may be eliminated by mounting the capacitors of the resonant circuits on the rotor of the synchronous machine.

By constructing a synchronous machine as described above, an effective absorption function (extinction or reduction function of specific higher harmonic components on the AC system side) can be provided to the synchronous machine. When a brushless synchronous machine can be used for the synchronous machine, cumbersome works such as inspection, maintenance, replacement of parts, etc, become unnecessary by the elimination of the slip rings and the brushes, and operating reliability of the synchronous machine is improved.

By the provision of the above described higher harmonics absorption measures according to the present invention, the synchronous machine can be down-sized when compared with the conventional synchronous machine, which presumes flowing-in of the higher harmonics. The present higher harmonics absorption measures can be used for the substitution of expensive active filters.

What is claimed is:

1. A rotating field synchronous machine comprising;
   magnetic poles;
   a damper winding disposed on each of said magnetic poles and constituting by itself an independent closed circuit, said damper winding being divided into a predetermined number of winding divisions, each thereof having predetermined winding turns; and a plurality of capacitors connected in parallel with said winding divisions;

thereby enabling a series resonant circuit to include said capacitors and said damper winding, so that said series resonant circuit resonates at a specific resonant frequency.

2. The rotating field synchronous machine as claimed in claim 1 wherein said rotating field synchronous machine comprises a synchronous machine with a high harmonics absorption function.

3. The rotating field synchronous machine as claimed in claim 2, wherein said resonant frequency is set at a frequency 6n times as high as a fundamental frequency of said synchronous machine, wherein n is a positive integer.

4. The rotating field synchronous machine as claimed in claim 2, wherein said capacitors are mounted on a rotor of said synchronous machine.

5. The rotating field synchronous machine as claimed in claim 2, wherein said capacitors are disposed on an external stationary side of said synchronous machine and connected with said damper winding through pairing slip rings and brushes.

6. The rotating field synchronous machine as claimed in claim 2, wherein said rotating field synchronous machine comprises a brush-less synchronous machine thereto an excitation current is supplied from a rotating armature type AC exciter mounted on a common shaft with said synchronous machine.

7. The rotating field synchronous machine as claimed in claim 2, wherein first said capacitors are connected through parallel circuits with said damper winding said parallel circuits having a reactor and second said capacitors.

8. A rotating field synchronous machine comprising;

magnetic poles;

a field winding disposed on said magnetic poles;

a DC reactor between said field winding and a DC excitation power supply for said field winnding, for blocking flowing-in of higher harmonics to said DC excitation power supply; and a capacitor connected in parallel with said field winding on the field winding side of said DC reactor;

thereby forming a series resonant circuit which includes said capacitor and said field winding, so that said series resonant circuit resonates at a specific resonant frequency.

9. The rotating field synchronous machine as claimed in claim 8 wherein said rotating field synchronous machine comprises a synchronous machine with a high harmonics absorption function.

10. The rotating field synchronous machine as claimed in claim 8, wherein said resonant frequency is set at a frequency 6n times as high as a fundamental frequency of said synchronous machine, wherein n is a positive integer.

11. The rotating field synchronous machine as claimed in claim 8, wherein said rotating field synchronous machine comprises a brush-less synchronous machine thereto an excitation current is supplied from a rotating armature type AC exciter mounted on a common shaft with said synchronous machine, and said capacitor is mounted on a rotor of said synchronous machine.

12. The rotating field synchronous machine as claimed in claim 8, wherein said capacitor is connected through a parallel circuit of a reactor and a capacitor with said field winding.

13. A rotating field synchronous machine comprising;

magnetic poles;

a damper winding disposed on each of said magnetic poles and constituting by itself an independent closed circuit, said damper winding being divided into predetermined number of winding divisions, each thereof having predetermined winding turns;

first capacitors, each thereof being connected in parallel with each of said winding divisions;

a first series resonant circuit, further comprising said first capacitors and said damper winding, for resonating at a first resonant frequency;

a field winding disposed on said magnetic poles;

a second capacitor connected in parallel with said field winding; and a second series resonant circuit, further comprising said second capacitor and said field winding, for resonating at a second resonant frequency.

14. The rotating field synchronous machine as claimed in claim 13 wherein said rotating field synchronous machine comprises a synchronous machine with a high harmonics absorption function.

15. The rotating field synchronous machine as claimed in claim 13, wherein said first and said second resonant frequencies are set at a frequency 6n times as high as a fundamental frequency of said synchronous machine, wherein n is a positive integer.

16. The rotating field synchronous machine as claimed in claim 13, wherein said first capacitors are mounted on a rotor of said synchronous machine.

17. The rotating field synchronous machine as claimed in claim 13, wherein said first capacitors are disposed on an external stationary side of said synchronous machine and connected with said damper winding through pairing slip rings and brushes.

18. The rotating field synchronous machine as claimed in claim 13, wherein said rotating field synchronous machine comprises a brush-less synchronous machine thereto an excitation current is supplied from a rotating armature type AC exciter mounted on a common shaft with said synchronous machine, and said first and second capacitors are mounted on a rotor of said synchronous machine.

19. The rotating field synchronous machine as claimed in claim 13, wherein said first capacitors are connected through parallel circuits of a reactor and a capacitor with said damper winding, and said second capacitor is connected through a parallel circuit of a reactor and a capacitor with said field winding.

* * * * *